No. 896,904. PATENTED AUG. 25, 1908.
J. S. FOULKE & T. J. FLAVIN.
DANDELION KILLER.
APPLICATION FILED JULY 22, 1907.
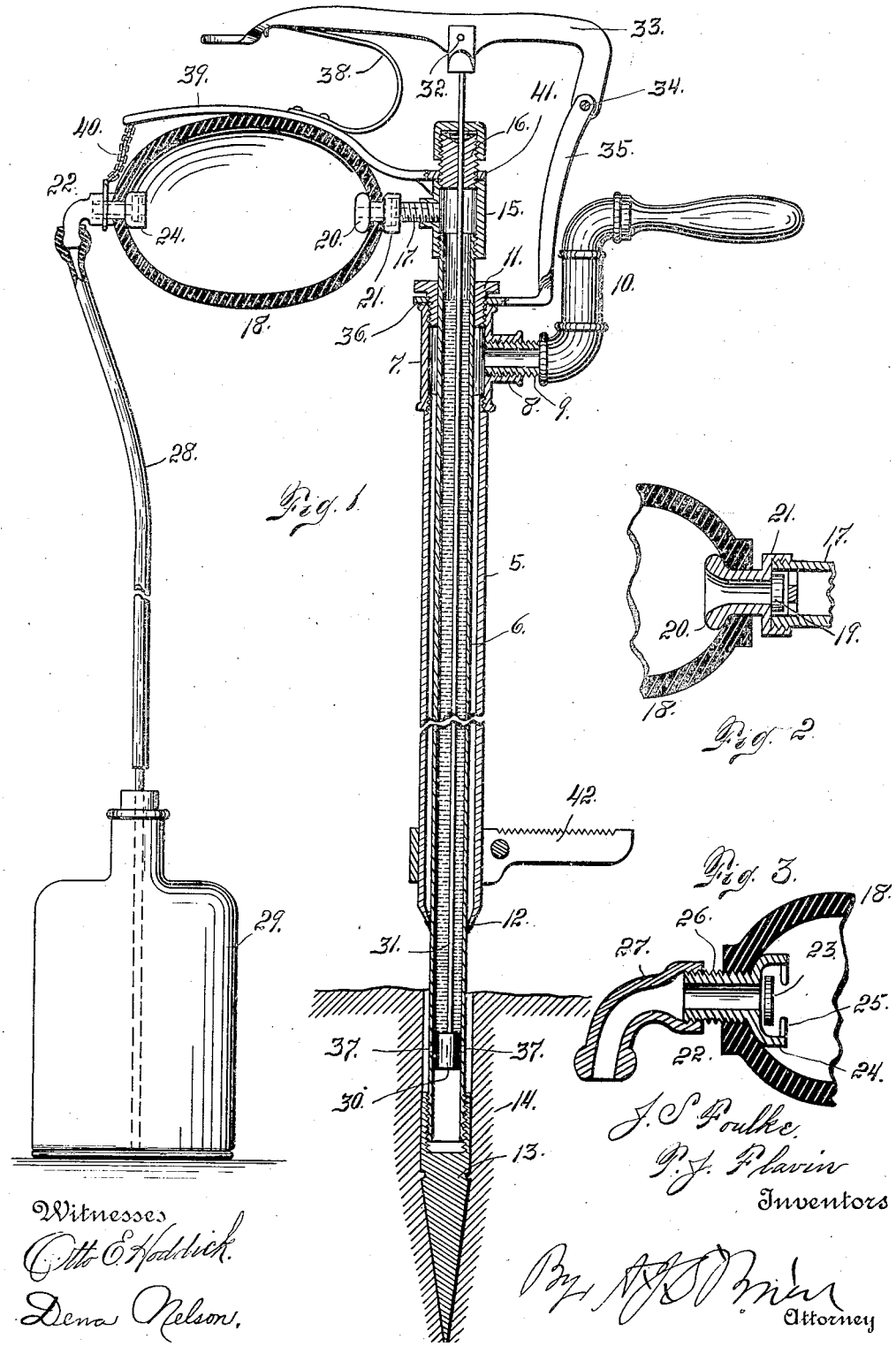

UNITED STATES PATENT OFFICE.

JOSEPH S. FOULKE AND THOMAS J. FLAVIN, OF GUNNISON, COLORADO.

DANDELION-KILLER.

No. 896,904.   Specification of Letters Patent.   Patented Aug. 25, 1908.

Application filed July 22, 1907. Serial No. 385,074.

*To all whom it may concern:*

Be it known that we, JOSEPH S. FOULKE and THOMAS J. FLAVIN, both citizens of the United States, residing at Gunnison, in the county of Gunnison and State of Colorado, have invented certain new and useful Improvements in Dandelion - Killers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to a device adapted for use in the killing of obnoxious weeds as dandelions, and Canadian and Russian thistles.

The device is constructed to deliver to the root of the plant a liquid of such character as to kill the same without interfering with the grass or surrounding plants which it is not desired to destroy.

Generally speaking our improvement consists of a liquid-containing tube whose lower extremity is pointed to facilitate its entrance into the ground in the immediate vicinity of the plant to be destroyed. In communication with this tube is a bulb which is also connected with a source of liquid supply, whereby the liquid may be forced into the tube and out into the earth through openings formed in the tube. In order to prevent more liquid from escaping from the tube than is necessary or desirable, the tube is provided with a valve normally closing the exit openings therein. This valve is operated from a lever so arranged that the valve may be moved to open the exit orifices of the tube, simultaneously with the pressure of the bulb for forcing the liquid into and out of the tube.

The invention will now be described in detail reference being made to the accompanying drawing in which is illustrated an embodiment thereof.

In this drawing, Figure 1 is a view of the device shown in section and also in connection with a liquid-containing receptacle forming the source of supply for the instrument. Fig. 2 is a fragmentary view of the bulb showing the valve mechanism at one end. Fig. 3 is a similar view of the opposite end of the bulb.

The same reference characters indicate the same parts in all the views.

Let the numeral 5 designate a casing in which is secured a tube 6. This tube projects both above and below the casing. The upper part of the casing is provided with a sleeve 7 provided with an interiorly threaded nipple 8 in which is screwed an exteriorly threaded stem 9 of a handle 10 whereby the handle is connected with the casing. Into the top of the sleeve 7 is screwed a reducing sleeve 11 which fits the tube 6 tightly and secures and holds the latter in operative position within the casing. The tube is brazed or otherwise suitably secured to the lower extremity of the casing as shown at 12. To the lower end of the tube is connected a pointed device 13 which readily enters the ground 14. The point as shown in the drawing is attached to the tube by a threaded connection. To the upper extremity of the tube is applied a sleeve 15, the top of which is closed by a screw plug 16. Into this sleeve 15 is screwed a casing 17 connected with one extremity of a rubber bulb 18. Within the valve casing is located a valve device 19. The valve casing 17 is enlarged both on the inside and outside of the bulb as shown at 20 and 21 whereby the casing is held securely in place. To the opposite extremity of the bulb is connected a similar casing 22 in which is located a valve piece 23. The casing 22 is enlarged within the bulb as shown at 24 and is provided with projections to hold the valve in place when in the open position. The casing 22 has a threaded stem 26 to which is secured an elbow member 27 with which is connected a flexible conduit 28 leading to a receptacle 29 containing the weed destroying liquid.

Within the tube 6 is located a piston valve 30 connected with the lower extremity of a rod 31. This rod passes through an opening in the plug 16 which forms a guide for the rod. The rod also projects above the plug 16 and is connected as shown at 32 with a lever 33 fulcrumed at 34 on an arm 35 mounted on the upper part of the casing as shown at 36.

The rod is normally held in position to cause the valve to close the exit orifices 37 of the tube, by a spring 38 attached to an arm 39 and bearing against the lever 33 whereby the said lever is normally held in a position corresponding with the aforesaid position of the valve 30. The arm 39 projects over the top of the bulb 18 and is connected with the valve casing 22 at one extremity by a chain 40. The opposite extremity of the arm 39 is connected with the plug 16 as shown at 41. The free extremity of the lever 33 projects over the arm 39 and extends above the bulb 18, whereby it is conveniently located to be actuated by the hand of the user while pressing the bulb. To the lower part of the casing 5 is applied a device 42, which is clamped to the casing and forms a support for the foot of the user, for convenience in forcing the pointed extremity of the device into the earth.

From the foregoing description the use and operation of our improved device will be readily understood. Assuming that the receptacle 29 contains the necessary weed-killing liquid, when the device is in use, its point 13 may be forced into the earth as shown in the drawing, by pressing upon the part 42 of the casing. This point should be forced into the earth in close proximity to the plant to be killed. As soon as this has been done, the hand of the user presses upon the bulb 18 which it may be assumed is filled with liquid from the receptacle 29. The pressure of this bulb, forces the liquid out of the bulb into the tube 6. Simultaneously with the pressure of the bulb, the lever 33 is actuated to depress the rod 31 and force the valve 30 downwardly, uncovering the ports or orifices 37 of the tube 6, allowing the liquid, to pass downwardly into contact with the roots of the weed to be destroyed. This operation is only momentary, after which the hand of the user which has pressed the bulb, is opened, allowing the bulb to expand, whereby it is again filled with liquid by the opening of the valve 23 in response to the suction or partial vacuum produced. It will be observed that as the bulb is pressed, the valve 23 is closed while the valve piece 19 is forced to the open position allowing the liquid to pass freely from the bulb into the tube. During the use of the device, it is supported in proper position by the handle 10 which is grasped by one hand of the user. The conduit 28 is supposed to be of such length, as to leave the receptacle 29 in a suitable location where it need not be often moved. In other words the device may be moved about a lawn of ordinary size for killing dandelions, without moving the receptacle. Or this receptacle may be comparatively small as a quart bottle, which may be readily moved from place to place as circumstances may require.

Having thus described our invention, what we claim is:

1. A dandelion killer comprising a liquid-containing tube in the lower portion of which is formed an exit orifice, a valve located in the tube and of the same size as the inner diameter of the tube whereby it forms a piston, the said valve being located in the tube below the liquid and forming a support for the latter, there being a space below the valve when in position to close the exit orifice, to permit its downward movement when it is desired to open the exit orifice, the said valve being provided with a rod protruding from the upper extremity of the tube for operating purposes.

2. A weed killing device, comprising a tube having a pointed lower extremity and provided with a liquid-escape orifice formed in its lower portion, a valve located in the tube, a suitable connection with the valve whereby the latter is normally in position to close the said orifice, said connection including a spring-actuated lever, an expansible bulb connected in operative relation with the tube, the lever being arranged in such proximity to the bulb that the lever may be actuated by the same hand that presses the bulb.

3. A weed killing device comprising a casing, a tube mounted in the casing and provided with a pointed lower extremity, an expansible bulb connected in operative relation with the tube for forcing liquid thereinto, the tube having exit orifices near its lower extremity, a valve for closing said orifices, a lever mounted on the casing, and a suitable connection between the lever and the valve, the lever being located in such proximity to the bulb that the lever may be operated to open the valve simultaneously with the pressure of the bulb, substantially as described.

4. The combination with a tube adapted to hold liquid and having a pointed lower extremity, the tube having exit orifices formed in its lower portion, a valve located in the tube and of the same size as the inner diameter of the tube, the said valve normally being in position to close the exit orifices of the tube, the said valve being located below the liquid and forming a support for the latter, the tube having a space below the valve when the latter is in position to close the exit orifices, to permit the downward movement of the valve in order to open said orifices and permit the escape of liquid, and a rod connected with the said valve and protruding from the upper extremity of the tube for operating purposes, substantially as described.

In testimony whereof we affix our signatures in presence of two witnesses.

JOSEPH S. FOULKE.
THOMAS J. FLAVIN.

Witnesses:
E. E. MUELLER,
J. M. McDOUGAL.